(12) United States Patent
Chun et al.

(10) Patent No.: US 9,583,265 B2
(45) Date of Patent: Feb. 28, 2017

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Byoung Jin Chun, Suwon-si (KR); Je Ik Moon, Suwon-si (KR); Jae Hwan Han, Suwon-si (KR); Seung Hee Yoo, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 231 days.

(21) Appl. No.: 14/320,150

(22) Filed: Jun. 30, 2014

(65) Prior Publication Data

US 2015/0092316 A1    Apr. 2, 2015

(30) Foreign Application Priority Data

Oct. 2, 2013  (KR) .................. 10-2013-0118113

(51) Int. Cl.
  *H01G 4/30*  (2006.01)
  *H01G 4/232* (2006.01)
  *H01G 4/12*  (2006.01)

(52) U.S. Cl.
  CPC ............ *H01G 4/30* (2013.01); *H01G 4/2325* (2013.01); *H01G 4/12* (2013.01)

(58) Field of Classification Search
  CPC .. H01G 4/30; H01G 4/06; H01G 4/12; H01G 4/2325
  See application file for complete search history.

(56) References Cited

U.S. PATENT DOCUMENTS 6,956,731 B2 * 10/2005 Yoshii ................. H01G 4/2325
                                                        361/321.1
2005/0012200 A1  1/2005 Sawada et al.
(Continued)

FOREIGN PATENT DOCUMENTS

CN      1639815 A    7/2005
CN    101165826 A    4/2008
(Continued)

OTHER PUBLICATIONS

Japanese Office Action dated Sep. 8, 2015 issued in Japanese Patent Application No. 2014-132324 (English translation thereof).
(Continued)

*Primary Examiner* — Nguyen Ha
(74) *Attorney, Agent, or Firm* — McDermott Will & Emery LLP

(57) ABSTRACT

A multilayer ceramic electronic component includes a ceramic body including internal electrodes and dielectric layers, and an electrode layer disposed on at least one surface of the ceramic body and electrically connected to the internal electrodes. A conductive resin layer containing metal particles and a base resin is disposed on the electrode layer. When a weight ratio of metal to carbon in a surface portion of the conductive resin layer is defined as A, and a weight ratio of metal to carbon in an internal portion of the conductive resin layer is defined as B, A is greater than B.

23 Claims, 7 Drawing Sheets

A-A'

(56) References Cited

U.S. PATENT DOCUMENTS

| | | | |
|---|---|---|---|
| 2005/0083637 A1 | 4/2005 | Yoshll et al. | |
| 2006/0256495 A1 | 11/2006 | Tominaga | |
| 2008/0073108 A1 | 3/2008 | Saito et al. | |
| 2009/0190285 A1 | 7/2009 | Kusano et al. | |
| 2011/0007449 A1 | 1/2011 | Seo et al. | |
| 2012/0286214 A1 | 11/2012 | Kuromi et al. | |
| 2013/0107420 A1 | 5/2013 | Sakurada et al. | |
| 2014/0063683 A1* | 3/2014 | Gu | H01G 4/30 361/301.4 |
| 2014/0204502 A1* | 7/2014 | Chun | H01G 4/30 361/301.4 |

FOREIGN PATENT DOCUMENTS

| | | |
|---|---|---|
| EP | 1 482 524 A1 | 12/2004 |
| JP | 2002-203737 A | 7/2002 |
| JP | 2005-051226 A | 2/2005 |
| JP | 2006-295077 A | 10/2006 |
| JP | 2008-085280 A | 4/2008 |
| JP | 2011-18874 A | 1/2011 |
| JP | 2013-118357 A | 6/2013 |
| KR | 2012-0099803 A | 9/2012 |
| WO | 03/075295 A1 | 9/2003 |
| WO | 2008/035727 A1 | 3/2008 |

OTHER PUBLICATIONS

Office Action issued on Nov. 14, 2014 in Korean Patent Application No. 10-2013-0118113 (English translation).

Chinese Office Action issued in Chinese Application No. 201410340526.4, dated Nov. 17, 2016, with English Translation.

* cited by examiner

MULTILAYER CERAMIC ELECTRONIC COMPONENT AND METHOD OF MANUFACTURING THE SAME

CROSS-REFERENCE TO RELATED APPLICATION

This application claims priority to, and of Korean Patent Application No. 10-2013-0118113 filed on Oct. 2, 2013, with the Korean Intellectual Property Office, the entire content of which is hereby incorporated by reference.

TECHNICAL FIELD

The present disclosure relates to a multilayer ceramic electronic component and a method of manufacturing the same.

BACKGROUND

Among ceramic electronic components, multilayer ceramic capacitors (MLCCs) include a plurality of stacked dielectric layers, internal electrodes disposed to face each other with one of the dielectric layers interposed therebetween, and external electrodes electrically connected to the internal electrodes.

MLCCs have been widely used as components in computers, mobile communications devices such as personal digital assistants (PDAs), mobile phones, and the like, due to advantages such as a small size, high capacitance, ease of mounting, and the like.

Recently, as electronic products have been miniaturized and multi-functionalized, chip components have also tended to be miniaturized and multi-functionalized. Therefore, a small sized multilayer ceramic capacitor having a high degree of capacitance is in demand.

To this end, a multilayer ceramic capacitor in which an increased number of dielectric layers are stacked with decreased thicknesses of dielectric layers and internal electrode layers has been manufactured, and external electrode thicknesses have also been reduced.

In addition, as various functions of devices and apparatuses in fields requiring high degrees of reliability, such as those of vehicles or medical devices, have been digitalized and demands thereon have increased, high degrees of reliability are also required in multilayer ceramic capacitors.

Factors causing problems in terms of the implementation of high degrees of reliability, as described above, may include the infiltration of a plating solution occurring at the time of a plating process, crack generation due to external impacts, and the like.

Therefore, as a means for solving such problems, a resin composition containing a conductive material is applied between an electrode layer of the external electrode and a plating layer to absorb external impacts and prevent the infiltration of the plating solution, thereby improving product reliability.

However, in the case of providing a conductive resin layer between the electrode layer of the external electrode and the plating layer, an interface separation phenomenon may occur between the conductive resin layer and the plating layer, and a plating defect in which a non-plated region is formed at the time of forming the plating layer on the conductive resin layer may occur.

Therefore, a multilayer ceramic capacitor capable of decreasing the incidence of such an interface separation phenomenon between the conductive resin layer and the plating layer and a non-plating defect is required.

RELATED ART DOCUMENTS (Patent Document 1) Japanese Patent Laid-Open Publication No. 2005-051226
(Patent Document 2) Japanese Patent Laid-Open Publication No. 2008-085280
(Patent Document 3) Japanese Patent Laid-Open Publication No. 2006-295077
(Patent Document 4) Korean Patent Laid-Open Publication No. 2012-0099803

SUMMARY

Some embodiments of the present inventive concept may provide a multilayer ceramic electronic component capable of improving plating properties and coupling strength between a conductive resin layer and a plating layer, and a method of manufacturing the same.

An aspect of the present disclosure relates to a multilayer ceramic electronic component including a ceramic body including internal electrodes and dielectric layers, and an electrode layer disposed on at least one surface of the ceramic body and electrically connected to the internal electrodes. A conductive resin layer containing metal particles and a base resin is disposed on the electrode layer. When a weight ratio of metal to carbon in a surface portion of the conductive resin layer is A, and a weight ratio of metal to carbon in an internal portion of the conductive resin layer is B, A is greater than B.

A/B may be in a range of 1.2 or above to 2.0 or less.

The weight ratio A of metal to carbon in the surface portion of the conductive resin layer may be from 3.5 to 4.5.

The metal particles may be partially exposed from the base resin.

Portions of the metal particles may protrude from the base resin, thereby being partially exposed to an exterior of the conductive resin layer.

The conductive resin layer may have a concave-convex surface.

The conductive resin layer may have a concave-convex surface including surfaces of metal particles exposed to an exterior of the conductive resin layer.

Portions of the metal particles may protrude from the base resin, thereby being partially exposed to an exterior of the conductive resin layer, and a surface of the base resin may rise by a predetermined height at interfaces between the base resin and the protruding metal particles to enclose the protruding metal particles.

The metal particles may contain one or more of copper, silver, nickel, and alloys thereof.

The metal particles may contain copper coated with silver.

The multilayer ceramic electronic component may further include a plating layer disposed on the conductive resin layer.

The ceramic body may have a length of 300 to 700 μm and a width of 150 to 400 μm.

Another aspect of the present disclosure encompasses a method of manufacturing a multilayer ceramic electronic component including forming a ceramic body including dielectric layers and internal electrodes. An electrode layer is formed on an end surface of the ceramic body electrically connected to one ends of the internal electrodes. A conductive resin composition containing metal particles, a solid-phase resin present in a solid phase at room temperature, and a liquid-phase resin present in a liquid phase at room temperature, is applied onto the electrode layer. The conductive resin composition is cured to form a conductive resin layer such that a weight ratio of metal to carbon in a surface portion of the conductive resin layer is higher than a weight ratio of metal to carbon in an internal portion of the conductive resin layer.

The conductive resin composition may contain 50 to 70 parts by weight of the liquid-phase resin based on 100 parts by weight of a sum of the solid-phase resin and the liquid-phase resin.

When the weight ratio of metal to carbon in the surface portion of the conductive resin layer is A, and the weight ratio of metal to carbon in the internal portion of the conductive resin layer is B, A/B may be in a range of 1.2 or above to 2.0 or less.

The weight ratio A of metal to carbon in the surface portion of the conductive resin layer may be from 3.5 to 4.5.

Portions of the metal particles may protrude from the base resin, thereby being partially exposed to an exterior of the conductive resin layer.

The conductive resin layer may have a concave-convex surface.

The conductive resin layer may have a concave-convex surface including surfaces of metal particles exposed to the exterior among the metal particles.

Portions of the metal particles may protrude from the base resin, thereby being partially exposed to an exterior of the conductive resin layer, and a surface of the base resin may rise by a predetermined height at interfaces between the base resin and the protruding metal particles to enclose the protruding metal particles.

Still another aspect of the present disclosure relates to a multilayer ceramic electronic component including a ceramic body including internal electrodes and dielectric layers, and an electrode layer disposed on at least one surface of the ceramic body and electrically connected to the internal electrodes. A conductive resin layer containing metal particles and a base resin is disposed on the electrode layer. Portions of the metal particles protrude from the base resin layer, thereby being partially exposed to an exterior of the conductive resin layer.

The conductive resin layer may have a concave-convex surface.

The conductive resin layer may have a concave-convex surface including surfaces of metal particles exposed to the exterior among the metal particles.

BRIEF DESCRIPTION OF DRAWINGS

The above and other aspects, features and other advantages of the present disclosure will be more clearly understood from the following detailed description taken in conjunction with the accompanying drawings, in which like reference characters may refer to the same or similar parts throughout the different views. The drawings are not necessarily to scale, emphasis instead being placed upon illustrating the principles of the embodiments of the present inventive concept. In the drawings, the thickness of layers and regions may be exaggerated for clarity.

DETAILED DESCRIPTION

Figure 1:
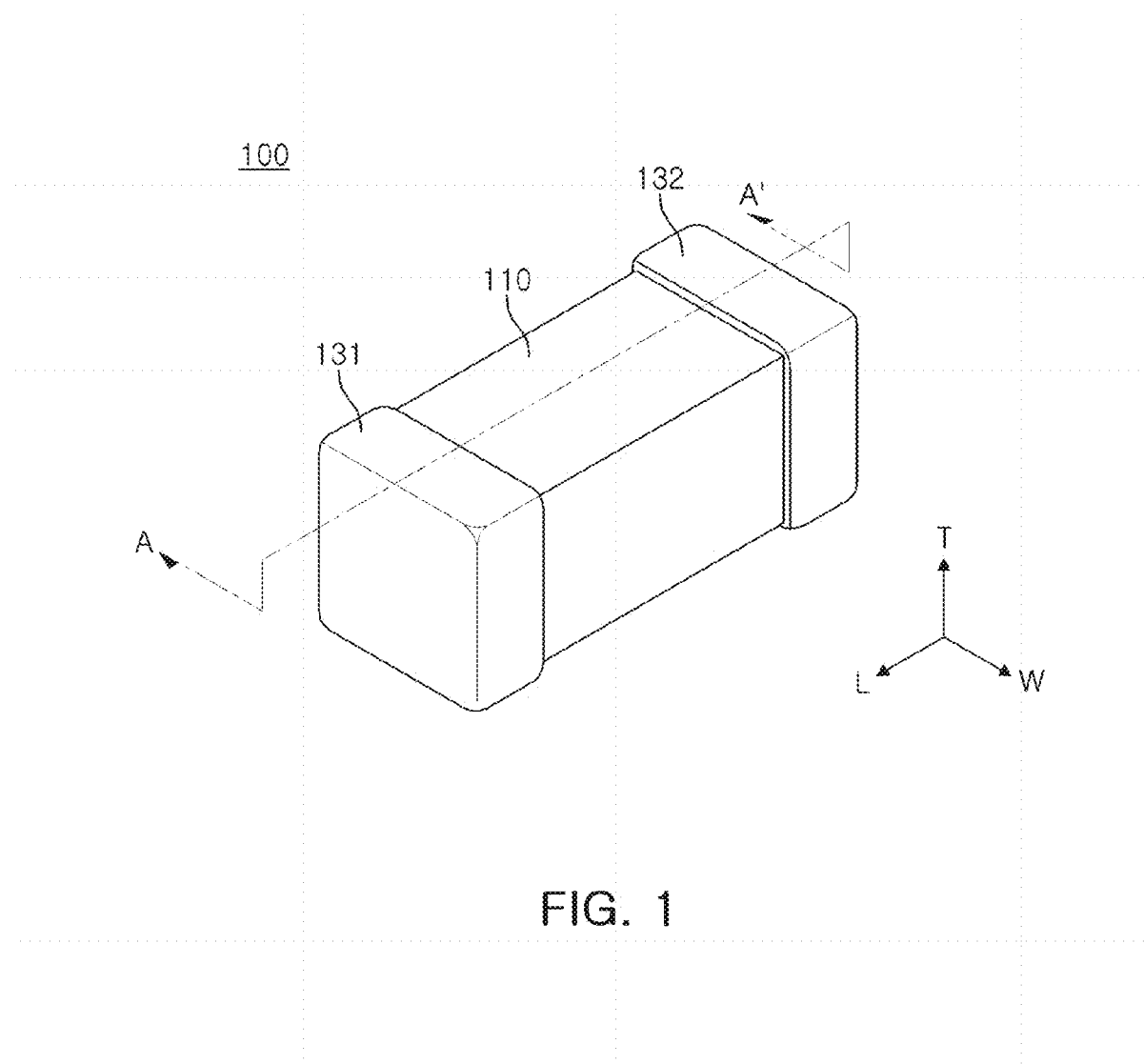
FIG. 1 is a perspective view illustrating a multilayer ceramic electronic component according to an exemplary embodiment of the present inventive concept.

Hereinafter, embodiments of the present inventive concept will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Hereinafter, a multilayer ceramic capacitor will be described by way of example of a multilayer ceramic electronic component, but the present disclosure is not limited thereto.

Figure 2:
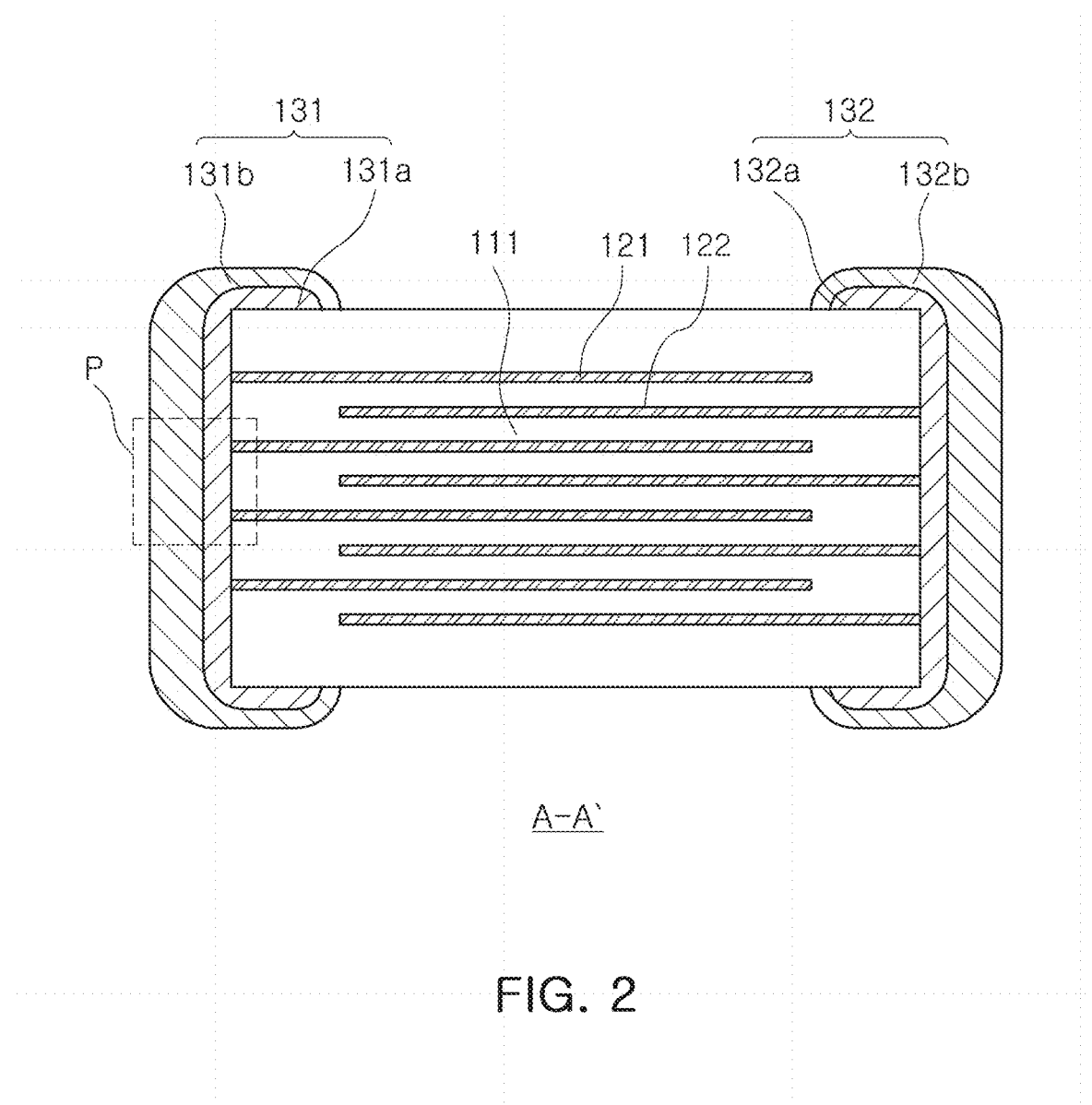
FIG. 2 is a cross-sectional view taken along line A-A' of FIG. 1.

FIG. 1 is a perspective view illustrating the multilayer ceramic electronic component 100 according to an exemplary embodiment of the present inventive concept, and FIG. 2 is a cross-sectional view taken along line A-A' of FIG. 1.

Referring to FIGS. 1 and 2, the multilayer ceramic electronic component 100 according to an exemplary embodiment of the present inventive concept may be a multilayer ceramic capacitor including a ceramic body 110 as well as external electrodes 131 and 132.

The ceramic body 110 may include an active layer as a portion thereof contributing to the formation of capacitance, and upper and lower cover layers formed on upper and lower surfaces of the active layer as upper and lower margin parts, respectively. The active layer may include dielectric layers 111 and internal electrodes 121 and 122, and a plurality of first and second internal electrodes 121 and 122 may be alternately formed with the dielectric layer 111 interposed therebetween.

In an exemplary embodiment of the present inventive concept, a shape of the ceramic body 110 is not particularly limited, but may be a substantially hexahedral shape. A difference in a thickness of the ceramic body 110 may be generated according to the sintering shrinkage of ceramic powder at the time of sintering a chip and the presence or absence of an internal electrode pattern. Edge parts of the ceramic body may be polished, such that the ceramic body 110 does not have a perfect hexahedral shape but may have a substantially hexahedral shape.

Directions of a hexahedron will be defined in order to clearly describe exemplary embodiments of the present inventive concept. L, W and T directions illustrated in the accompanying drawings (see FIG. 1) refer to a length direction, a width direction, and a thickness direction, respectively. Here, the thickness direction may be the same as a stacking direction in which dielectric layers are stacked.

The internal electrode may include the first and second internal electrodes 121 and 122. The first and second internal electrodes may be disposed to face each other with the dielectric layer 111 interposed therebetween. The first and second internal electrodes 121 and 122, pairs of electrodes having different polarities, may be formed by printing a conductive paste containing a conductive metal on the dielectric layer 111 at a predetermined thickness in the stacking direction of the dielectric layers 111 to be alternately exposed to both end surfaces of the ceramic body 110 (e.g., end surfaces facing the external electrodes 131 and 132 in FIG. 2). The first and second internal electrodes 121 and 122 may be electrically insulated from each other by the dielectric layer 111 disposed therebetween.

For example, the first and second internal electrodes 121 and 122 may be electrically connected to the external electrodes via portions thereof alternately exposed to both end surfaces of the ceramic body 110, respectively. The external electrode may include first and second external electrodes 131 and 132. The first internal electrode 121 may be electrically connected to the first external electrode 131, and the second internal electrode 122 may be electrically connected to the second external electrode 132.

Therefore, when a voltage is applied to the first and second external electrodes 131 and 132, electrical charges may be accumulated between the first and second internal electrodes 121 and 122 facing each other. In this case, capacitance of the multilayer ceramic capacitor 100 may be in proportion to an area of an overlapped region between the first and second internal electrodes 121 and 122.

A thickness of the first and second internal electrodes 121 and 122 may be determined according to the intended use thereof. For example, the thickness may be determined in a range of 0.2 to 1.0 µm in consideration of a size and capacitance of the ceramic body 110, but the present disclosure is not limited thereto.

Further, a conductive metal contained in the first and second internal electrodes 121 and 122 may be nickel (Ni), copper (Cu), palladium (Pd), or alloys thereof, but the present disclosure is not limited thereto.

In this case, a thickness of the dielectric layer 111 may be optionally changed according to a capacitance design of the multilayer ceramic capacitor. A thickness of a single dielectric layer may be 0.1 to 10 µm after sintering in consideration of the size and capacitance of the ceramic body 110, but the present disclosure is not limited thereto.

Further, the dielectric layer 111 may contain ceramic powder having a high degree of permittivity, for example, a barium titanate ($BaTiO_3$)-based powder, a strontium titanate ($SrTiO_3$)-based powder, or the like, but the present disclosure is not limited thereto.

The upper and lower cover layers may have the same material and configuration as those of the dielectric layer 111 except that internal electrodes are not included therein. The upper and lower cover layers may be formed by stacking a single dielectric layer or two or more dielectric layers on upper and lower surfaces of the active layer in a vertical direction, respectively, and generally serve to prevent the first and second internal electrodes 121 and 122 from being damaged by physical or chemical stress.

The first external electrode 131 may include a first electrode layer 131a and a conductive resin layer 131b, and the second external electrode 132 may include a second electrode layer 132a and a conductive resin layer 132b.

Further, the first and second external electrodes 131 and 132 may further include a plating layer (not shown) formed on the conductive resin layers 131b and 132b.

The first and second electrode layers 131a and 132a may be directly connected to the first and second internal electrodes 121 and 122 to secure electrical connectivity between the external electrodes and the internal electrodes.

The first and second electrode layers 131a and 132a may contain a conductive metal, and the conductive metal may be nickel (Ni), copper (Cu), palladium (Pd), gold (Au), or alloys thereof, but the present disclosure is not limited thereto.

The first and second electrode layers 131a and 132a may be sintering-type electrodes formed by sintering of a paste containing the conductive metal.

The conductive resin layers 131b and 132b may be disposed on the first and second electrode layers 131a and 132a. For example, the conductive resin layer may be disposed on outer surfaces of the first and second external electrode layers.

In addition, although not shown in the accompanying drawing, a plating layer may be disposed on outer surfaces of the conductive resin layers 131b and 132b.

Figure 3:
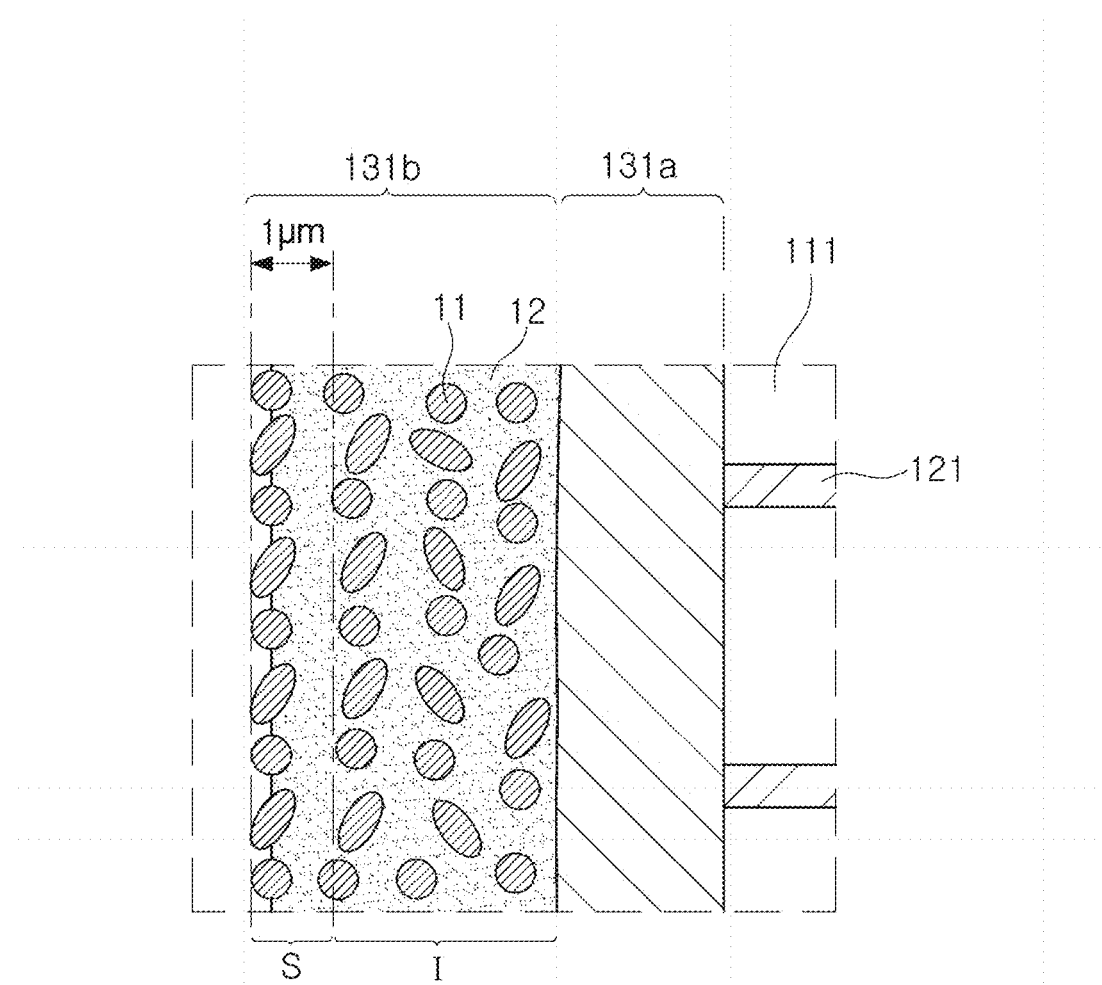
FIG. 3 is an enlarged view of part P of FIG. 2.

FIG. 3 is an enlarged view of part P of FIG. 2.

Although part P, a cross-sectional portion of the first external electrode 131, is enlarged and illustrated in FIG. 3, configurations of the first and second external electrodes 131 and 132 are similar to each other except that the first external electrode 131 is electrically connected to the first internal electrode 121 and the second external electrode 132 is electrically connected to the second internal electrode 122. Therefore, hereinafter, a description will be provided only based on the first external electrode 131, but this description applies to the second external electrode 132 in a similar manner.

As illustrated in FIG. 3, the conductive resin layer 131b may contain metal particles 11 and a base resin 12, and the base resin 12 may contain a thermo-setting resin. The thermo-setting resin may be an epoxy resin, but is not limited thereto.

The metal particles 11 may contain one or more of copper, silver, nickel, and alloys thereof, and may contain copper coated with silver. The metal particles 11 may be partially exposed to the exterior on the surface of the conductive resin layer 131b.

In addition, a content of the base resin 12 contained in the conductive resin layer 131b may be smaller in a surface portion S than a content of the base resin 12 in an internal portion I. For example, according to an exemplary embodiment of the present inventive concept, since metal particles adjacent to the surface of the conductive resin layer are not completely embedded in the base resin, but portions of metal particles adjacent to the surface of the conductive resin layer may protrude from the base resin instead of being embedded in the base resin, the content of the base resin in the surface portion S of the conductive resin layer may be smaller than that in the internal portion.

The 'surface portion S' refers to a section of which a distance from an outermost surface of the conductive resin layer containing metal particles and the base resin to a portion inwardly disposed thereof is less than about 1 µm as illustrated in FIG. 3, and the other region except for the 'surface portion S' may be defined as the 'internal portion I'.

The outermost surface may be defined as a virtual surface obtained by virtually connecting top points of metal particles protruding from the base resin (for example, peaks of regions of metal particles, by which metal particles protrude). In other words, the outermost surface may be defined as a virtual surface contacting top points (for example, peaks of protrusion regions of the metal particles) of the metal particles protruding from the base resin.

Further, the conductive resin layer 131b according to an exemplary embodiment of the present inventive concept may have a concave-convex surface due to metal particles that are not embedded in the base resin but protrude therefrom.

When metal particles are exposed in a manner in which they partially protrude from the surface of the conductive resin layer 131b, an area ratio occupied by the conductive metal to that occupied by the base resin 12 in the surface of the conductive resin layer may be increased. Thus, at the time of forming the plating layer on the surface of the conductive resin layer, a non-plating region may not be formed, but a uniform plating layer may be formed.

In addition, since the conductive resin layer 131b contains the base resin 12 and metal particles 11, the conductive resin layer 131b contains carbon and metal. When a weight ratio of metal to carbon in the surface portion S is defined as A and a weight ratio of metal to carbon in the internal portion I of the conductive resin layer is defined as B, A may be more than B (A>B).

The weight ratio of metal to carbon in the surface portion S refers to a ratio (metal/carbon (wt %/wt %)) of the wt % of metal in the surface portion S to wt % of carbon in the surface portion S of the conductive resin layer 131b, and a weight ratio of metal to carbon in the internal portion I refers to a ratio (metal/carbon (wt %/wt %)) of the wt % of metal in the surface portion S to wt % of carbon in the internal portion I of the conductive resin layer 131b.

The weight ratios of metal to carbon in the surface portion S and the internal portion I may be measured by energy dispersive X-ray spectrometer (EDS) quantitative analysis. The EDS analysis may be performed on at least five points of each of the surface portion S and the internal portion I, and then an average value may be calculated from the measured values.

Further, according to an exemplary embodiment of the present inventive concept, when the weight ratio of metal to carbon in the surface portion S of the conductive resin layer 131b is defined as A and the weight ratio of metal to carbon in the internal portion I of the conductive resin layer is defined as B, A/B may be in a range of 1.2 to 2.0 (1.2≤A/B≤2.0).

When A/B is less than 1.2, an amount of the base resin in the surface may be relatively large. Therefore, in the case of forming the plating layer on the conductive resin layer, a plating defect such that a non-plated region is formed may occur. In the case of increasing the weight ratio of metal to carbon in the surface portion and the internal portion while maintaining A/B to be less than 1.2 in order to prevent the plating defect, a content of the entire base resin in the conductive resin layer is decreased, such that adhesive force with the electrode layer may not be secured.

Therefore, in order to prevent the plating defect while securing adhesive force between the conductive resin layer and the electrode layer, A/B may be 1.2 or more.

Further, when A/B is greater than 2.0, at the time of forming the plating layer on the conductive resin layer, plating properties may be significantly increased, but as a difference in distribution of the resin between the surface portion and the internal portion of the conductive resin layer is increased, the resin in the surface portion may be rapidly decreased. Thus, metal particles on the surface of the conductive resin layer may be separated from the conductive resin layer.

At the time of performing a plating process after forming the conductive resin layer, chips (multilayer ceramic electronic components including the conductive resin layer formed thereon) inserted into a plating bath in a barrel are mixed with each other in the barrel by movement, due to rotation of the barrel. In this case, when A/B is greater than 2.0, the resin in the surface portion is rapidly decreased. As a result, when physical damage to chips, due to impacts between the chips or between an internal surface of the barrel and the chips, occurs, metal particles of the surface may be separated from the conductive resin layer, and the plating layer may be non-uniform.

Further, when the plating layer is formed on the conductive resin layer, the plating layer may be separated from the conductive resin layer or delamination may occur between the conductive resin layer and the plating layer due to separation of metal particles from the surface. In addition, when the surface portion of the conductive resin layer contains the base resin at a level at which metal particles of the surface of the conductive resin layer are not separated and A/B is greater than 2.0, a content of metal particles of the internal portion is decreased, and thus, an equivalent series resistance (ESR) of the conductive resin layer may be increased.

According to an exemplary embodiment of the present inventive concept, the weight ratio (A) of metal to carbon in the surface portion S of the conductive resin layer 131b may be 3.5 to 4.5.

For example, wt % of metal/wt % of carbon in the surface portion S may be 3.5 to 4.5.

When the weight ratio, A, is less than 3.5, an area occupied by the base resin in the surface of the conductive resin layer is increased, and at the time of forming the plating layer on the conductive resin layer, the plating defect such that a non-plating region is formed may occur. On the other hand, when A is greater than 4.5, the content of the base resin to metal particles is relatively low, and adhesive force of the base resin fixing metal particles exposed to the surface may be decreased. As a result, metal particles may be separated to thereby be detached from the conductive resin.

In a region in which metal particles of the surface of the conductive resin layer are separated to thereby be detached from the conductive resin, the base resin may be present on the surface instead of metal particles. Therefore, when a number of metal particles of the surface of the conductive resin layer are separated, the area occupied by the base resin in the surface may be increased, so that the plating properties may be deteriorated.

Further, when metal particles coupled to the plating layer are separated from the conductive resin after the plating layer is formed on the conductive resin layer, interlayer delamination between the plating layer and the conductive resin layer may occur.

In addition, according to an exemplary embodiment of the present inventive concept, a length of the ceramic body 110 may be 300 to 700 µm, and a width thereof may be 150 to 400 µm. According to an exemplary embodiment of the present inventive concept, even in the case of applying present disclosure to a ceramic body having such a small size, the plating properties may be sufficiently improved.

However, the application of the present disclosure is not limited to the small sized chip, but the present disclosure may be applied to a ceramic body regardless of the size thereof.

Related Art Document 1 shows that metal particles are disposed on a surface of a conductive resin layer, but that the metal particles are not contained in the conductive resin layer and are disposed on the surface of the conductive resin layer in a separate configuration. However, unlike Related Art Document 1, according an exemplary embodiment of the present inventive concept, metal particles contained in a conductive resin layer formed as a single layer are exposed to the surface of the conductive resin layer.

In detail, metal particles of the surface of the conductive resin layer according to an exemplary embodiment of the present inventive concept, which are contained in the conductive resin layer and protrude to thereby be exposed, are different from metal particles separately disposed on the surface after applying the conductive resin layer, in Related Art Document 1. In other words, in Related Art Document 1, the conductive resin layer and a metal particle layer on the surface of the conductive resin layer are two layers separated from each other. However, in an embodiment of the present inventive concept, metal particles disposed on the surface of the conductive resin layer formed as a single layer are exposed to the exterior of the conductive resin layer.

Further, in Related Art Document 1, there is a problem in that an amount of base resin contacting metal particles of the surface is relatively small, so that metal particles disposed on the surface of the conductive resin layer may be easily separated from the conductive resin layer.

Figure 4A:
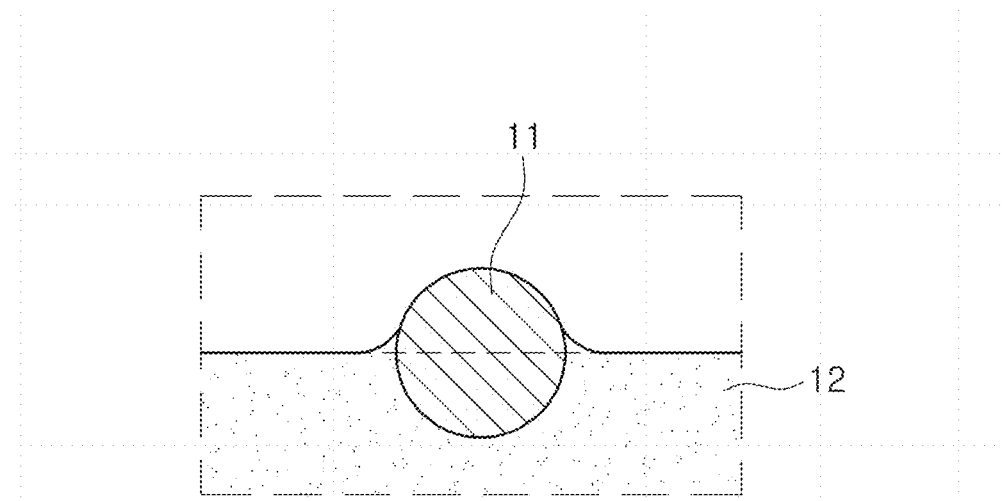
FIG. 4A is a view illustrating metal particles according to an exemplary embodiment of the present inventive concept exposed to a surface of a conductive resin layer.
Figure 4B:
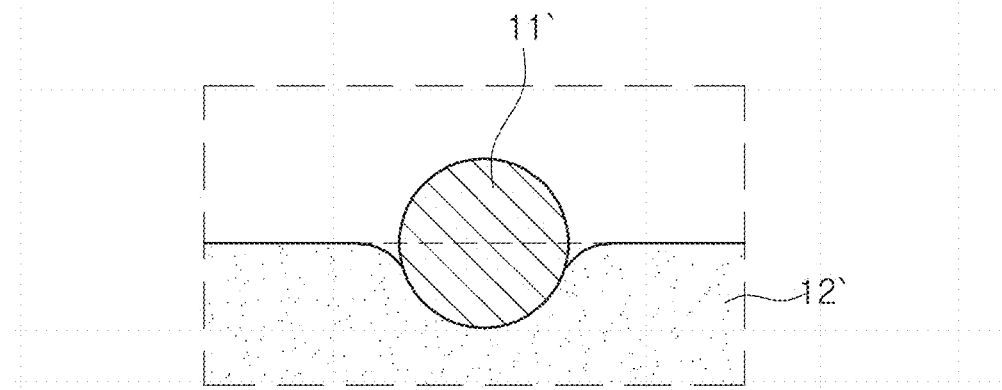
FIG. 4B is a view illustrating metal particles according to a Comparative Example disposed on a conductive resin layer.

FIG. 4A is a view illustrating metal particles according to an exemplary embodiment of the present inventive concept exposed to a surface of a conductive resin layer, and FIG. 4B is a view illustrating metal particles disclosed in Related Art Document 1, disposed on a conductive resin layer.

When metal particles are separately disposed on the surface of the conductive resin layer as in Related Art Document 1, as the conductive resin layer is pressed as illustrated in FIG. 4B, a contact area between the base resin 12' contained in the conductive resin layer and metal particles 11' in the vicinity of the surface is decreased, such that metal particles may be easily separated from the conductive resin layer. On the other hand, in an exemplary embodiment of the present inventive concept, when metal particles in the conductive resin layer are exposed, the base resin rises at an interface between the base resin and the protruding metal particles due to surface tension, as illustrated in FIG. 4A, to increase a contact area between the base resin and metal particles exposed to the surface, so that metal particles are not easily separated from the conductive resin layer.

Further, when the weight ratio of metal to carbon in the surface portion of the conductive resin layer is defined as A and the weight ratio of metal to carbon in the internal portion of the conductive resin layer is defined as B, a relationship corresponding to A or A/B is not disclosed in Related Art Document 1, as compared to the present disclosure.

Further, in Related Art Document 2, a conductive resin layer is composed of two layers and a content of a metal particle in a secondary conductive resin layer is higher than that of metal particles in a primary conductive resin layer. In Related Art Document 2, since separate conductive resin layers are formed, each of the resin layers has a predetermined thickness, and a process using a paste for forming the conductive resin layer needs to be performed twice. However, according to an exemplary embodiment of the present inventive concept, as the conductive resin layer is composed of a single layer, a relatively thin conductive resin layer may be formed, and a process of applying a paste for forming the conductive resin layer may be simplified.

In Related Art Document 3, metal particles are exposed to a surface of a conductive resin layer, but the metal particles are exposed through a polishing process instead of protruding. In this case, weight ratios of metal to carbon in a surface portion and an internal portion of the conductive resin layer are the same as each other, and in this regard, Related Art Document 3 is different from the present disclosure.

Further, in the case of a method of polishing the surface of the conductive resin layer to expose metal particles as in Related Art Document 3, it is not easy to apply this method to a relatively small sized chip due to limitations in polishing efficiency, and a non-plating defect may occur according to the limited polishing efficiency.

However, in the present disclosure, since metal particles are exposed to the surface of the conductive resin layer without performing a separate polishing process (see a manufacturing process to be described below with reference to FIG. 7), the process may be simplified. Even when the base resin slightly remains on metal particles existing on the surface of the conductive resin layer and the polishing process is performed, an amount of the base resin is relatively small. As a result, the base resin covering metal particles disposed on the surface of the conductive resin layer may be easily removed even when polishing efficiency is relatively low.

In other words, unlike Related Art Document 3, according to an exemplary embodiment of the present inventive concept, at the time of forming the plating layer on the conductive resin layer, plating properties may be improved regardless of the size of the ceramic body, and the present disclosure may be easily applied to the manufacturing of a small sized electronic component including a ceramic body 110 having a length of 300 to 700 μm and a width of 150 to 400 μm.

Figure 5A:
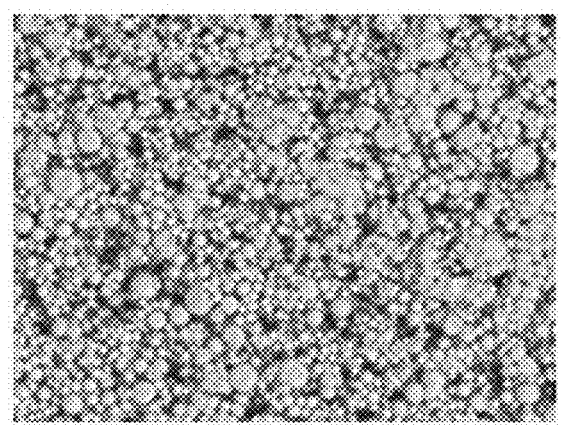
FIG. 5A is a photograph illustrating a surface of a conductive resin layer of a multilayer ceramic electronic component according to an exemplary embodiment of the present inventive concept.
Figure 5B:
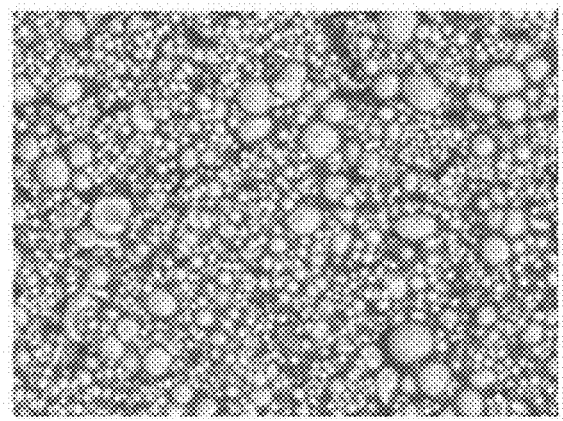
FIG. 5B is a photograph illustrating a surface of a conductive resin layer of a multilayer ceramic electronic component according to the Comparative Example.

FIG. 5A is a photograph illustrating the surface of the conductive resin layer of the multilayer ceramic electronic component according to an exemplary embodiment of the present inventive concept, and FIG. 5B is a photograph illustrating a surface of the conductive resin layer of the multilayer ceramic electronic component according to the Comparative Example in which metal particles are not exposed to a surface of a conductive resin layer, unlike in the case of the present disclosure.

It may be appreciated that on the surface of the conductive resin layer of the multilayer ceramic electronic component according to an exemplary embodiment of the present inventive concept, metal particles are exposed, such that metal particles are clearly illustrated as in FIG. 5A, but in FIG. 5B, metal particles are covered by the conductive resin to thereby be unclear.

Figure 6A:
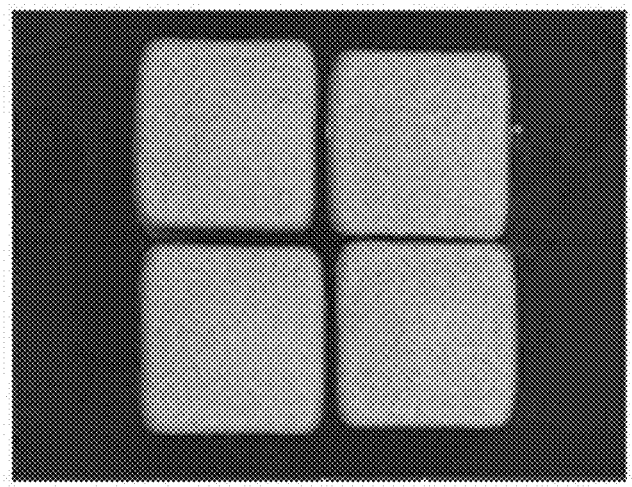
FIG. 6A is a photograph of a surface of a plating layer formed on the conductive resin layer according to the exemplary embodiment of FIG. 5A.
Figure 6B:
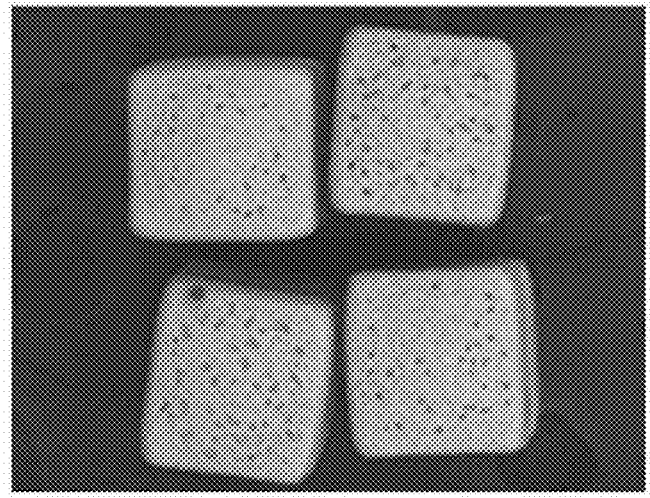
FIG. 6B is a photograph of a surface of a plating layer formed on the conductive resin layer according to the Comparative Example illustrated in FIG. 5B.

FIG. 6A is a photograph obtained by forming a plating layer on the conductive resin layer according to the exemplary embodiment of FIG. 5A and then photographing a surface of the plating layer, and FIG. 6B is a photograph obtained by forming a plating layer on the conductive resin layer according to the Comparative Example illustrated in FIG. 5B and then photographing a surface of the plating layer. It may be confirmed that when metal particles were exposed to the surface of the conductive resin layer as in an exemplary embodiment of the present inventive concept, the plating layer may be uniformly formed on the surface of the conductive resin layer without a non-plated region as illustrated in FIG. 6A. However, when metal particles are not exposed to the surface of the conductive resin layer, at the time of forming the plating layer on the conductive resin layer, the plating layer may not be uniformly formed, and non-plating regions may be formed therein, such as the plating defect, as illustrated in FIG. 6B.

Method of Manufacturing Multilayer Ceramic Capacitor

Hereinafter, a method of manufacturing a multilayer ceramic electronic component according to an exemplary embodiment of the present inventive concept will be described, but the present inventive concept is not limited thereto. Hereinafter, the method of manufacturing a multilayer ceramic capacitor will be described by way of example.

In addition, among descriptions of the method of manufacturing a multilayer ceramic capacitor according to an exemplary embodiment of the present inventive concept, a description overlapping with that of the above-mentioned multilayer ceramic capacitor according to the foregoing exemplary embodiment of the present inventive concept will be omitted.

Figure 7:
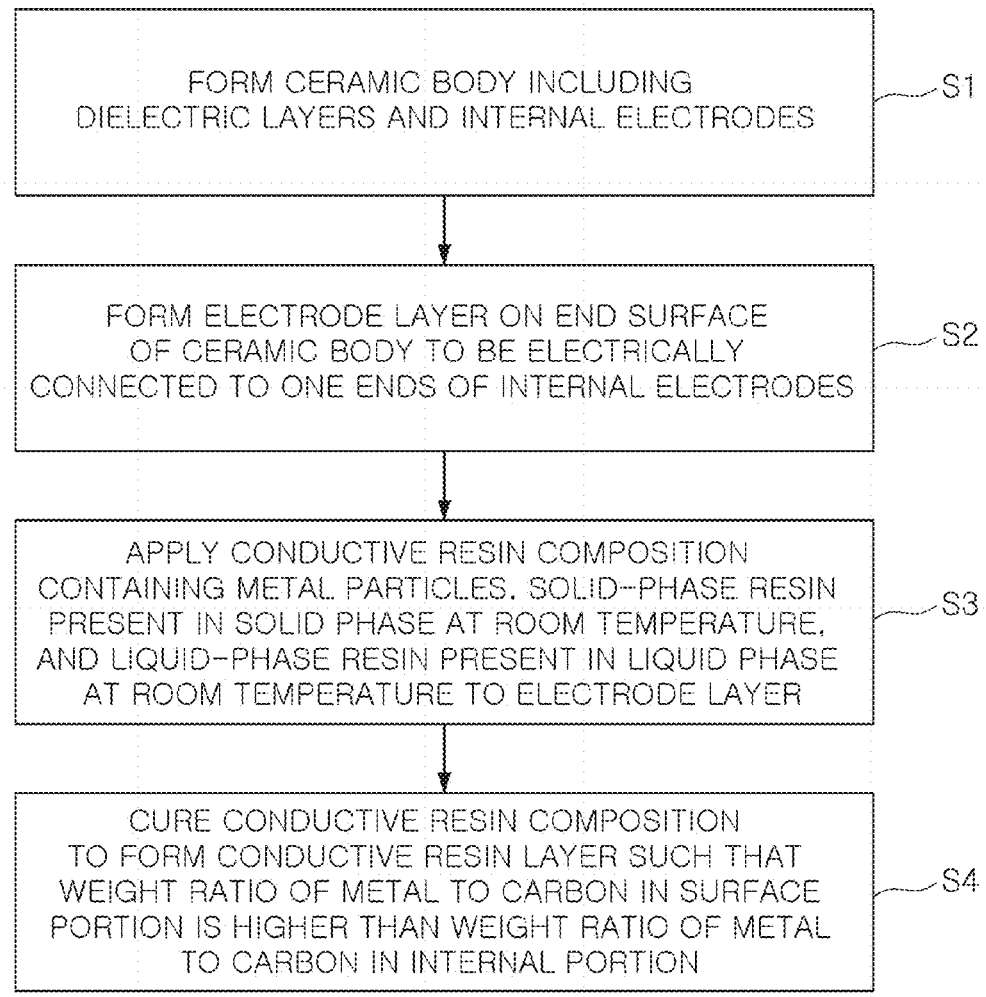
FIG. 7 is a manufacturing process flow chart illustrating a method of manufacturing a multilayer ceramic electronic component according to another exemplary embodiment of the present inventive concept.

FIG. 7 is a manufacturing process flow chart illustrating a method of manufacturing a multilayer ceramic electronic component according to another exemplary embodiment of the present inventive concept.

Referring to FIG. 7, the method of manufacturing a multilayer ceramic capacitor according to the exemplary embodiment of the present inventive concept may include forming a ceramic body including dielectric layers and internal electrodes (S1). An electrode layer may be formed on an end surface of the ceramic body to be electrically connected to one end of the internal electrode (S2). A conductive resin composition containing metal particles, a solid-phase resin present in a solid phase at room temperature, and a liquid-phase resin present in a liquid phase at room temperature may be applied to the electrode layer (S3). The conductive resin composition may be cured to form a conductive resin layer so that a weight ratio of metal to carbon in a surface portion of the conductive resin layer is higher than a weight ratio of metal to carbon in an internal portion thereof (S4).

In the method of manufacturing a multilayer ceramic capacitor according to an exemplary embodiment of the present inventive concept, first, a slurry containing powder such as barium titanate ($BaTiO_3$) powder, or the like, may be applied to a carrier film and dried thereon to prepare a plurality of ceramic green sheets, thereby forming a dielectric layer and a cover layer.

The ceramic green sheets may be manufactured by mixing the ceramic powder, a binder, and a solvent to prepare the slurry and manufacturing the prepared slurry in a sheet shape having a thickness of several μm by a doctor blade method.

Next, a conductive paste for an internal electrode containing nickel powder may be prepared.

After the conductive paste for an internal electrode is applied to the green sheets by a screen printing method to form the internal electrode, a plurality of green sheets on which the internal electrode is printed may be stacked, and a plurality of green sheets on which the internal electrode is not printed may be stacked on upper and lower surfaces of this multilayer body, followed by sintering, thereby manufacturing a ceramic body 110. The ceramic body may include first and second internal electrodes 121 and 122, dielectric layers 111, and the cover layer. The dielectric layer may be formed by sintering the green sheets on which the internal electrode is printed, and the cover layer may be formed by sintering the green sheets on which the internal electrode is not printed.

The internal electrode may include the first and second internal electrodes 121 and 122.

The first and second electrode layers 131a and 132a may be formed on outer surfaces of the ceramic body to be electrically connected to the first and second internal electrodes, respectively. The first and second electrode layers may be formed by sintering a paste containing a conductive metal and glass.

The conductive metal is not particularly limited, but may be, for example, one or more selected from copper (Cu), silver (Ag), nickel (Ni), and alloys thereof.

The glass is not particularly limited, but may be a material having the same composition as that of glass used to form an external electrode of a general multilayer ceramic capacitor.

Next, the conductive resin composition containing metal particles, the solid-phase resin, and the liquid-phase resin may be applied to and cured on outer surfaces of the first and second electrode layers, thereby forming conductive resin layers 131b and 132b.

The metal particles may contain one or more of copper, silver, nickel, alloys thereof, and copper coated with silver, but are not limited thereto.

The solid-phase resin and the liquid-phase resin may include a thermosetting resin, for example, an epoxy resin.

The solid-phase resin refers to a resin that is present in a solid phase at room temperature and is not liquefied without a solvent and may be an epoxy resin of which a softening point is greater than room temperature.

The liquid-phase resin refers to a resin present in a liquid phase at room temperature. The liquid-phase resin may have a molecular weight of 1000 g/mol or lower before curing and be a resin of which a softening point is equal to or less than room temperature due to a relatively low molecular weight and binding strength between molecules. The liquid-phase resin may be directly applied to the conductive resin composition without a solvent. In other words, the liquid-phase resin may form a paste without a solvent.

The liquid-phase resin may be, for example, a resin present in a liquid phase at room temperature due to a low molecular weight among bisphenol A resins, glycol epoxy resins, novolac epoxy resins, or derivatives thereof, but is not limited thereto.

In further detail, as examples of the liquid-phase resin, polypropoxylate bisphenol A (PBPA), and D.E.R™ 330, D.E.R™ 332, D.E.R™ 362, D.E.R™ 364, and D.E.R™ 383, and the like, epoxy products manufactured by DOW Corp. may be used, but the present disclosure is not limited thereto.

In the method of manufacturing a multilayer ceramic electronic component according to an exemplary embodiment of the present inventive concept, the composition for forming the conductive resin layer may contain the liquid-phase resin, such that in the case of curing the conductive resin composition to form the conductive resin layer, the conductive resin layer may be formed so that the weight ratio of metal to carbon in the surface portion thereof is larger than the weight ratio of metal to carbon in the internal portion thereof.

Further, according to an exemplary embodiment of the present inventive concept, the conductive resin layer may be formed by applying the conductive resin composition containing 50 to 70 parts by weight of the liquid-phase resin based on 100 parts by weight of a sum of the solid-phase resin and the liquid-phase resin. In the case of applying the conductive resin composition and heat-treating the applied conductive resin composition to cure the conductive resin composition, a liquid-phase resin present in the vicinity of the surface of the conductive resin layer may easily volatilize before a temperature reaches a curing temperature. On the other hand, a liquid-phase resin present in the internal portion thereof is blocked by the solid-phase resin to thereby not volatilize, such that the liquid-phase resin may remain to thereby form a base resin together with the solid-phase resin.

When the liquid-phase resin present in the vicinity of the surface of the conductive resin layer volatilizes to thereby be removed before curing as in an exemplary embodiment of the present inventive concept, metal particles contained in the conductive resin layer may be exposed to the exterior through the surface of the conductive resin layer.

When a content of the liquid-phase resin contained in the entire resin components is less than 50 parts by weight, since flowability may be deteriorated and a surface volatilization effect may be decreased during the curing process, metal particles may not be exposed to the surface of the conductive resin layer, and the remaining resin component covering metal particles may be increased, such that a non-plating problem may occur. In addition, in the case in which the content of the liquid-phase resin contained in the entire resin components is greater than 70 parts by weight, flowability of the conductive resin composition may be increased in a heating section for curing, such that it may be difficult to control a shape of the conductive resin layer, and in the case of simultaneously forming a plurality of capacitors, a chip sticking defect in which external electrodes of capacitors adjacent to each other are stuck to each other may occur.

In more detail, with the method of manufacturing a multilayer ceramic electronic component according to an exemplary embodiment of the present inventive concept, the metal particles may be partially exposed to the exterior on the surface of the conductive resin layer, and portions of exposed metal particles may protrude from the surface of the conductive resin layer. In addition, the conductive resin layer may have a concave-convex surface due to the protruding metal particles.

For example, according to an exemplary embodiment of the present inventive concept, metal particles may be exposed to the surface of the conductive resin layer without a polishing process, and metal particles may protrude from the surface of the conductive resin layer without a separate attachment process of metal particles. Further, even in the case that the conductive resin composition is not composed of two or more layers, the conductive resin layer in which weight ratios of metal to carbon in the surface portion and the internal portion are different from each other may be formed.

Curing conditions of the conductive resin composition may be determined in consideration of a heat transfer rate by convection, a flowability of the resin depending on a temperature thereof, a curing rate, or the like, to form a conductive resin layer in which a weight ratio of metal to carbon in a surface portion is higher than a weight ratio of metal to carbon in an internal portion.

Further, when the weight ratio of metal to carbon in the surface portion of the formed conductive resin layer is defined as A and the weight ratio of metal to carbon in the internal portion of the conductive resin layer is defined as B, a heating condition for curing the conductive resin composition may be adjusted so that A/B is in a range of 1.2 to 2.0.

In addition, the weight ratio A of metal to carbon in the surface portion of the conductive resin layer may be from 3.5 to 4.5.

In the case of forming a conductive resin layer using a conductive resin composition containing a liquid-phase resin as in an exemplary embodiment of the present inventive concept, the liquid-phase resin present in the surface may partially volatilize, but the liquid-phase resin may partially remain and subsequently be cured to thereby form a base resin together with a solid-phase epoxy. In further detail, the liquid-phase resin present in a liquid phase before curing in the surface of the conductive resin composition may rise at an interface between metal particles and the liquid-phase resin by a predetermined height due to surface tension of the liquid such that the liquid-phase resin encloses metal particles. Thereafter, when curing is completed, and thus the liquid-phase resin is changed to the base resin, adhesion between the base resin and metal particles may be improved in accordance with the predetermined rising height (see FIG. 4A).

Further, the method of manufacturing a multilayer ceramic electronic component according to an exemplary embodiment of the present inventive concept may further include, after forming of the conductive resin layer, forming a plating layer on the conductive resin layer. In the case of forming the conductive resin layer and then forming the plating layer on the conductive resin layer as in an exemplary embodiment of the present inventive concept, a uniform plating layer may be formed without a non-plating region.

On the other hand, in Related Art Document 4, a resin electrode paste in which a resin having a high softening point mixed with a resin having a low softening point is used, but the resin having a low softening point is not a resin that is present in a liquid phase at room temperature, and a mixing ratio of the resin having a high softening point and the resin having a low softening point is also different from that in the present disclosure.

Experimental Example

The following Table 1 shows data indicating A/B (A: a weight ratio of metal to carbon in a surface portion of a conductive resin layer, B: a weight ratio of metal to carbon in an internal portion thereof) by varying a content of liquid-phase resin based on 100 parts by weight of a resin component contained in the conductive resin composition and varying a heating condition for curing. The data also indicate plating properties at the time of forming a plating layer on a conductive resin layer, whether or not metal particles of a surface are separated, and ease of controlling a shape of the conductive resin layer due to an increase in flowability at the time of heating for curing a conductive resin composition, based on A/B.

In the Experimental Examples, the conductive resin composition contained copper particles as metal particles, a bisphenol A (BPA) based epoxy resin having an average molecular weight (Mw) of about 50,000 as a solid-phase resin, a bisphenol A (BPA) based liquid-phase resin having a flowability of about 10000 cp at room temperature (25° C.) as a liquid-phase resin, and a solvent having a boiling point of 200 to 250° C.

In Table 1, heating conditions I, II, and III for curing are as follows. Heating condition I for curing is a heating profile in which a temperature maintaining section, i.e., a time period during which a predetermined temperature is maintained, is not present between a solvent volatilization temperature and a curing temperature. Heating condition II for curing is a heating profile in which a heating rate is the same as that of heating condition I for curing, except that the curing is delayed while maintaining a temperature (about 120 to 140° C.) in a section of the heating profile of heating condition II so as to secure flowability of the resin before the temperature reaches the curing temperature for a predetermined time, to thereby increase flowability. Finally, heating condition III is a heating profile in which the same temperature maintaining section as in the heating condition II is present, but a heating rate is lowered overall, such that resin flowability is able to be significantly secured, e.g., more secured than the heating condition II.

Although differences in the heating conditions are present, it can be appreciated from the experimental results that there was an overall tendency that the closer the heating conditions for curing were to those of heating condition I, the closer A/B was to 1, and the closer the heating conditions for curing were to those of heating condition III, the larger the A/B value became.

TABLE 1

| Sample | Content of Liquid-Phase resin in Resin Component (Parts by Weight) | Heating Condition for Curing | A/B | Plating properties | Separation of Metal Particles from Surface | Ease of Controlling Shape of Conductive Resin Layer |
|---|---|---|---|---|---|---|
| 1 | 40 | | 1.0 | NG | OK | OK |
| 2 | | | 1.1 | NG | OK | OK |
| 3 | | | 1.0 | NG | OK | OK |
| 4 | 50 | | 1.1 | NG | OK | OK |
| 5 | | | 1.5 | OK | OK | OK |
| 6 | | | 1.7 | OK | OK | OK |
| 7 | 60 | | 1.0 | NG | OK | OK |
| 8 | | | 1.2 | OK | OK | OK |
| 9 | | | 2.0 | OK | OK | OK |
| 10 | 70 | | 1.0 | NG | OK | OK |
| 11 | | | 1.1 | NG | OK | OK |
| 12 | | | 2.1 | OK | NG | OK |
| 13 | 80 | | 1.3 | OK | OK | NG |
| 14 | | | 1.1 | NG | OK | NG |
| 15 | | | 2.3 | OK | NG | NG |

OK: Plating defects did not occur, metal particles of the surface were not separated, or the shape of the conductive resin layer was good (a chip sticking phenomenon was not generated)

NG: Plating defects occurred, metal particles of the surface were separated, or the shape of the conductive resin layer was defective (a chip sticking phenomenon was generated).

In evaluating the plating properties at the time of forming the plating layer on the conductive resin layer, a non-plating area was 5% or less is represented by OK, and the non-plating area was more than 5% is represented by NG. Whether or not metal particles of the surface were separated was evaluated by performing a tape test of attaching tape to the surface of the conductive resin layer before forming the plating layer on the conductive resin layer and then separating the tape therefrom. The case in which metal particles were attached to the tape is represented by NG, and the case in which metal particles were not attached to the tape is represented by OK. In addition, in evaluating the ease of controlling the shape of the conductive resin layer, the case in which an external electrode was damaged due to the sticking phenomenon between the conductive resin layers configuring external electrodes of multilayer ceramic capacitors adjacent to each other during a manufacturing process is represented by NG, and the case in which the external electrode was not damaged is represented by OK.

As illustrated in Table 1, it may be appreciated that when the content of the liquid-phase resin is less than 50 parts by weight based on 100 parts by weight of the resin component of the conductive resin composition, the plating defect occurs regardless of the heating condition for curing, and when the content of the liquid-phase resin is more than 70 parts by weight based on 100 parts by weight of the resin component of the conductive resin composition, the shape of the conductive resin layer is not controlled, such that the chip sticking defect occurs.

In addition, reviewing the plating properties and ease of controlling the shape of the conductive resin layer with respect to the A/B value controlled according to the heating condition for curing, when A/B is less than 1.2, the plating properties are not good, and when A/B is more than 2.0, metal particles are easily separated from the surface of the conductive resin layer.

The following Table 2 shows data indicating whether or not a plating defect (plating properties) and an interlayer separation phenomenon in which a conductive resin layer and a plating layer are separated from each other occur at the time of forming the plating layer on the conductive resin layer according to a weight ratio A of metal to carbon in a surface portion of a conductive resin layer of a multilayer ceramic capacitor.

TABLE 2

| Sample | A | Plating properties | Interlayer Separation |
|---|---|---|---|
| 1 | 2.5 | NG | OK |
| 2 | 3.0 | NG | OK |
| 3 | 3.5 | OK | OK |
| 4 | 4.0 | OK | OK |
| 5 | 4.5 | OK | OK |
| 6 | 5.0 | OK | NG |
| 7 | 5.5 | OK | NG |

OK: Plating defects did not occur, or the conductive resin layer and the plating layer were not separated from each other.

NG: the plating defects occurred, or the conductive resin layer and the plating layer were separated from each other.

Referring to Table 2, it may be appreciated that when A is less than 3.5, the plating defect occurs, and when A is more than 4.5, delamination or the interlayer separation phenomenon occurs between the conductive resin layer and the plating layer.

According to exemplary embodiments of the present inventive concept, the multilayer ceramic electronic component capable of improving the plating properties and coupling strength between the conductive resin layer and the plating layer, and a method of manufacturing the same may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component, comprising:
   a ceramic body including internal electrodes and having respective dielectric layers interposed therebetween;
   an electrode layer disposed on at least one surface of the ceramic body and electrically connected to the internal electrodes; and
   a conductive resin layer disposed on the electrode layer and containing metal particles and a base resin,
   wherein a group of the metal particles protrude from the base resin, and
   a surface of the base resin first rises with respect to the ceramic body at an interface between one of the group of the metal particles and the base resin and then drops with respect to the ceramic body at a vicinity of the interface.

2. The multilayer ceramic electronic component of claim 1, wherein when a weight ratio of metal to carbon in a surface portion of the conductive resin layer is A, and a weight ratio of metal to carbon in an internal portion of the conductive resin layer is B, A/B is in a range of 1.2 or above to 2.0 or less.

3. The multilayer ceramic electronic component of claim 1, wherein A is from 3.5 to 4.5, in which A is a weight ratio of metal to carbon in a surface portion of the conductive resin layer.

4. The multilayer ceramic electronic component of claim 1, wherein the surface of the base resin is hardened without a polishing process.

5. The multilayer ceramic electronic component of claim 1, wherein the conductive resin layer has a concave-convex surface.

6. The multilayer ceramic electronic component of claim 1, wherein the conductive resin layer has a concave-convex surface including surfaces of metal particles exposed to an exterior of the base resin.

7. The multilayer ceramic electronic component of claim 1, wherein the group of the metal particles are partially exposed to an exterior of the conductive base resin layer.

8. The multilayer ceramic electronic component of claim 1, wherein the metal particles contain one or more of copper, silver, nickel, and alloys thereof.

9. The multilayer ceramic electronic component of claim 1, wherein the metal particles comprise copper coated with silver.

10. The multilayer ceramic electronic component of claim 1, further comprising a plating layer disposed on the conductive resin layer.

11. The multilayer ceramic electronic component of claim 10, wherein the plating layer is in direct contact with the metal particles protruded from the base resin.

12. The multilayer ceramic electronic component of claim 1, wherein the ceramic body has a length of 300 μm to 700 μm and a width of 150 μm to 400 μm.

13. A method of manufacturing a multilayer ceramic electronic component, the method comprising:
   forming a ceramic body including dielectric layers and internal electrodes;
   forming an electrode layer on an end surface of the ceramic body electrically connected to one ends of the internal electrodes;
   applying, onto the electrode layer, a conductive resin composition containing metal particles, a solid-phase resin present in a solid phase at room temperature, and a liquid-phase resin present in a liquid phase at room temperature; and
   forming a conductive resin layer including the metal particles and a base resin by curing the conductive resin composition,
   wherein during the process that the conductive resin cures, the liquid-phase volatilizes, thereby portions of the metal particles protrude from the base resin.

14. The method of claim 13, wherein the conductive resin composition contains 50 to 70 parts by weight of the liquid-phase resin based on 100 parts by weight of a sum of the solid-phase resin and the liquid-phase resin.

15. The method of claim 13, wherein when a weight ratio of metal to carbon in a surface portion of the conductive resin layer is A, and a weight ratio of metal to carbon in an internal portion of the conductive resin layer is B, A/B is in a range of 1.2 or above to 2.0 or less.

16. The method of claim 13, wherein a weight ratio A of metal to carbon in a surface portion of the conductive resin layer is from 3.5 to 4.5.

17. The method of claim 13, wherein the conductive resin layer has a concave-convex surface.

18. The method of claim 13, wherein the conductive resin layer has a concave-convex surface including surfaces of metal particles exposed to an exterior of the base resin.

19. The method of claim 13, wherein the portions of the metal particles are partially exposed to an exterior of the conductive resin layer, and a surface of the base resin rises at interfaces between the base resin and the protruding metal particles by a predetermined height to partially enclose the protruding metal particles.

20. A multilayer ceramic electronic component, comprising:
   a ceramic body including internal electrodes and dielectric layers;
   an electrode layer disposed on at least one surface of the ceramic body and electrically connected to the internal electrodes; and
   a conductive resin layer disposed on the electrode layer and containing metal particles and a base resin,
   wherein portions of the metal particles protrude from the base resin, thereby being partially exposed to an exterior of the base resin, and
   A B is from 1.2 to 2.0, in which A is a weight ratio of metal to carbon in a surface portion of the conductive resin layer and B is a weight ratio of metal to carbon in an internal portion of the conductive resin layer.

21. The multilayer ceramic electronic component of claim 20, wherein the conductive resin layer has a concave-convex surface.

22. The multilayer ceramic electronic component of claim 20, wherein the conductive resin layer has a concave-convex surface including surfaces of the metal particles exposed to the exterior of the conductive base resin.

23. The multilayer ceramic electronic component of claim 20, wherein A is from 3.5 to 4.5.

* * * * *